US007903828B2

(12) United States Patent
Rodman

(10) Patent No.: US 7,903,828 B2
(45) Date of Patent: Mar. 8, 2011

(54) REMOTE MULTIPOINT ARCHITECTURE FOR FULL-DUPLEX AUDIO

(75) Inventor: Jeffrey C. Rodman, San Francisco, CA (US)

(73) Assignee: Polycom, Inc., Pleasanton, CA (US)

( * ) Notice: Subject to any disclaimer, the term of this patent is extended or adjusted under 35 U.S.C. 154(b) by 1538 days.

(21) Appl. No.: 11/065,792

(22) Filed: Feb. 25, 2005

(65) Prior Publication Data

US 2006/0193466 A1 Aug. 31, 2006

(51) Int. Cl.
*A61F 11/06* (2006.01)

(52) U.S. Cl. ............. 381/71.11; 379/406.02; 379/406.03

(58) Field of Classification Search ............. 379/202.02, 379/406.02, 406.03; 381/71.11
See application file for complete search history.

(56) References Cited

U.S. PATENT DOCUMENTS 5,555,310 A * 9/1996 Minami et al. .................. 381/17
6,147,979 A * 11/2000 Michel et al. ................. 370/292
2006/0133621 A1 * 6/2006 Chen et al. ...................... 381/92

* cited by examiner

*Primary Examiner* — Alexander Jamal
(74) *Attorney, Agent, or Firm* — Wong, Cabello, Lutsch, Rutherford & Brucculeri, LLP

(57) ABSTRACT

A method, microphone module and a system for full-duplex audio system implementing full duplex audio, audio echo cancellation and audio codec. The audio signals from the microphones and to the loudspeakers are encoded to reduce the transmission bandwidth requirement during wired or wireless transmission and decoded when needed for further processing. Each microphone has transceivers to receive signals fed to loudspeakers within the microphone module. An audio echo canceller is installed within each microphone module to generate echo free audio signal for further signal processing. Problems due to the combination of lossy codec and echo cancellation are avoided.

60 Claims, 9 Drawing Sheets

REMOTE MULTIPOINT ARCHITECTURE FOR FULL-DUPLEX AUDIO

CROSS-REFERENCE TO RELATED APPLICATIONS

None.

BACKGROUND OF THE INVENTION

1. Field of the Invention

This invention relates to an audio system, more specifically to microphone and loudspeaker systems which enable echo cancellation, wireless connection and data compression. The audio system of the present invention is useful in any system that utilizes audio such as telephone, video conferencing, PA systems, sound systems through computer communication etc.

2. Description of the Related Art

Teleconferencing has long been an essential tool for communication in business, government and educational institutions. There are many types of teleconferencing equipment based on many characterizations. One type of teleconferencing unit is a video conference unit, which transmits real-time video images as well as real-time audio signals. A video conferencing unit typically comprises a video processing component and an audio processing component. The video processing component may include a camera to pick up live images of conference participants and a video display for showing real-time video images of conference participants or images of documents. The audio portion of a video conferencing unit typically includes one or more microphones to pick up voice signals of conference participants, and loudspeakers to reproduce voices of the participants at the far end. There are audio-only conferencing systems also, and these are often configured in a similar manner. There are many ways to connect video and/or audio conferencing units. At the low end the link may be an analog plain old telephone service (POTS) line. It may be a digital service line such as an integrated service digital network (ISDN) line or a digital interface to PBX which may use a T1 or PRI line. More recently video conference units and speakerphones may be linked by digital networks using the Internet Protocol (IP), including the Internet. Satellite, cellular and other wireless communication protocols may also be used.

A teleconference unit typically has one or more loudspeakers for reproducing voices of participants at a far-end site and one or more microphones for picking up voices of participants at the near end site. To make more life-like conference, there may be multiple loudspeakers reproducing one or more audio channels. In a larger conference room, there may also be multiple microphones in order to pick up speech of participants seating around the conference room. Wired microphones or loudspeakers are unsightly and frequently cause wire tangling problems. Wireless microphones or loudspeakers, which can eliminate the connecting wires, are preferred.

Audio conferencing is commonly described as being either half-duplex, or full-duplex. In a half-duplex system, only one side can speak at a time. While speaking, the other side is blocked out. These systems are easier to build than full duplex systems, but result in unnatural conversations. In a full duplex system, both sides can speak at once. In order for this to be possible, such a system requires some method of keeping loudspeaker audio from being sent with the audio signal being picked up by the microphone. A common way of achieving this is by use of an echo canceller, more particularly an acoustic echo canceller or AEC. A typical full duplex audio system with a single audio channel is illustrated in FIG. 1. The system 100 has one microphone 12 and one loudspeaker 52. The microphone 12 generates an audio signal 62 and sends it to an Audio Echo Canceller (AEC) 22. The AEC 22 had two types of input signals and one output signal. The first input signal is the microphone signal. The second input signal is the loudspeaker signal. As shown in FIG. 1, the second input to the AEC 22 is a loudspeaker signal 76 which is the same signal 74 intended to be fed to the loudspeaker 52 as signal 72. The audio signal 62 coming from microphone 12 contains not only the desired audio signal from a target source, for example, a teleconference participant's speech or the sound of music played by a musician, it also contains the sound (feedback) from loudspeaker 52 and from room reflections of the loudspeaker sound. Assuming the amplification system of the audio system produces high-fidelity sound through the loudspeaker 52, the feedback picked up by the microphone 12 should be identical to the input of acoustic signal 76 to the AEC 22 plus room reflections of the loudspeaker sound. Therefore, AEC 22 can subtract the feedback due to loudspeaker 52 from the signal 62 so that a substantially echoless signal 64 leaves AEC 22 and feeds into system interface 30. The interface 30 is connected to the rest of the audio system 100 through two signals lines 64 and 74. The signal 64 is an audio output signal, which is the substantially echoless microphone signal. The signal 74 is an audio input signal, which is a loudspeaker signal.

FIG. 2 shows another audio system 200 which is similar to the audio system 100 illustrated in FIG. 1 except that audio system 200 has multiple microphones, 212, 214 and 216, each of which has an independent AEC 222, 224 and 226. With multiple microphones 212, 214 and 216, speeches or sounds for different talkers or participants in the conference can be more accurately or uniformly received by the audio system 200. Different talkers need not take turns speaking into a single microphone in order to be heard. Each AEC 222, 224 or 226 operates exactly the same way as the AEC 22 shown in FIG. 1. Each AEC still has a microphone input signal, one loudspeaker input signal and one output signal. The microphone input signals to the AECs are from different microphones and are different. But the loudspeaker input signals 279, 278 and 276 to each AEC 222, 224 and 226 are the same. These signals are all coming from the same loudspeaker signal 274, which is also sent to the loudspeaker 252 as loudspeaker signal 272. The output signals 264, 263 and 265 from AECs 222, 224 and 226 are fed to a mixer 240. The mixer 240 combines the multiple microphone signals 264, 263 and 265 into a single microphone signal 266, which is sent to the interface 230. The interface 230 is connected to the rest of system 200 through signal lines 266 and 274. In system 200 all connections are wired.

FIG. 3 shows an audio system 300, which comprises a microphone module 310, a loudspeaker module 350, a base station 320 and an interface 330. In this system 300, the microphone module 310 has a microphone 312 and a transmitter 332. The microphone 312 generates audio signal 362 and feeds audio signal 362 to transmitter 332. The base station 320 has a receiver 334, a transmitter 338 and an AEC 322. The base station 320 is coupled to the interface 330 through two signal lines 364 and 374. Receiver 334 regenerates the audio signal 362 as an audio signal 368, which is the microphone input to AEC 322. On the loudspeaker side, a loudspeaker signal 374 from the interface 330 is split into two paths. One goes into AEC 322 as the loudspeaker input signal 379. Another signal 378 is fed into a transmitter 338. The loudspeaker receiver 336 receives the radio signal and regenerates loudspeaker audio signal 372 and feeds it into the loudspeaker

352 to be reproduced. In this system 300, the wireless connections between receivers and transmitters are essentially lossless, either through a high fidelity analog system or through a digital wireless connection. Therefore the audio signal 368 is the same as the audio signal 362 generated by the microphone 312, and the loudspeaker signal 379 is the same as the loudspeaker signal 372 which feeds into the loudspeaker 352. Therefore, the AEC 322 works essentially the same way as the AEC 22 as shown in FIG. 1. The major benefit of this system is that the microphone module 310 and the loudspeaker module 350 are wirelessly connected to the base station 320 and the interface component 330. Therefore, the microphone module 320 and the loudspeaker 350 may be placed in any location within the radio range of the base station 320 of the conference room or the lecture hall. Further, for the AEC 322 to work properly the audio signals 368 and 379 must be of high quality. This requirement, in turn, demands high bandwidth between the transmitters 334 and 338 and receivers 332 and 336 for the microphone module 310, the loudspeaker module 350 and the base station 320. The demand of high bandwidth limits the number of microphone modules that can be used in this system.

To reduce bandwidth requirement, signals may be compressed before transmission and decompressed after reception. In typical signal processing, the compression and decompression are also called encoding and decoding, which is the function of a "codec." These are broadly classed as lossy and lossless. A lossless codec is one that can perfectly reproduce at its output what was put into its input. A lossy codec is one in which the output is slightly different. The art of the codec is to get as much compression as possible (fewest bits to the channel) while meeting the other goals of the codec. In reference to audio signal processing, lossy codecs work by exploiting weaknesses of the human ear, introducing distortions that the ear cannot detect. While the ear does not detect these changes in a good codec, such as MP3, an AEC will. A lossy codec can achieve much more compression (four to sixteen times compression, typically) than a lossless codec (two to three times compression), which is why lossy codecs are more frequently used. However, when a codec is used in an audio signal processing system, the AEC in the same system does not work properly. In order to have the audio system to work, one may have to disable the AEC within the system.

Depending on the configuration of the interfaces 30, 230 or 330, the systems 100, 200 or 300 may be used in various applications, such as an audio amplification system or a site of a teleconferencing system.

Some interfaces used in systems shown in FIGS. 1-3 are illustrated in more details in FIGS. 10*a* and 10*b*. FIG. 10*a* shows a simple interface 1030, which may be a direct connection between the microphone signal 1024 and the loudspeaker signal 1034. With this type of interface, the audio system 100 as shown in FIG. 1 is essentially a simple audio amplification system. The interface 1030 may also perform simple signal processing, such as pre-amplification, buffering etc.

FIG. 10*b* shows a more complicated interface 1035 which is typically used in a teleconferencing system. The interface 1035 may contain several components or network interfaces, for example, a plain old telephone service (POTS) interface 1045, a digital IP interface 1055, an audio interface 1075 and processor 1065. These components are logical components. Their functions may be performed by one or more circuitries, such as IC chips. The audio interface 1075 is coupled to the rest of an audio system with one audio input line 1044 and one audio output line 1048. The processor 1065 is used to process microphone signals, loudspeaker signals or other intermediate signals. Depending on the network employed in the conference system, other network interfaces may be installed in the interface 1035, instead of or in addition to the POTS interface 1045 or IP interfaces 1055.

In one example, where an IP network is used, a microphone signal 1044 is fed into the processor 1065 through audio interface 1075. The microphone signal 1044 is processed and/or converted to a proper format, then sent out as signal 1054 via the digital interface 1055 to a far end site of the teleconferencing system. Similarly, an audio signal 1058 from the far end site of the teleconferencing is received by the digital interface 1055 and is fed into the processor 1065. It is processed and/or converted into a loudspeaker signal 1048. The loudspeaker signal 1048 is fed via audio interface 1075 into the audio system of the near site of the teleconferencing system, for example the system 100, as shown in FIG. 1. If the teleconference system is connected through POTS network, then the POTS interface 1045 is utilized instead of IP interface 1055.

In a typical teleconferencing system among many audio systems, full duplex operation is a necessity. In a full duplex system, such as a speakerphone system, or an audio system used in lecture halls or theaters, it is desired to have one or more microphones connected by remote links, such as wireless connections. In these situations, there are many constraints. These include, for example, the available data bandwidth between the microphones and the network interface, aggregated data bandwidths available to all microphones together, the high signal quality required by AEC, battery life in the wireless accessories, the desire for wide audio bandwidths, and system cost. In order to meet these goals, it is desirable to compress the audio in the wireless unit prior to transmission, because fewer transmitted bits result in lower power consumption and lower usage of data bandwidth. Unfortunately, compression causes distortion. Audio compressors are optimized to hide this distortion from the ear, but distortion renders echo cancellation, including AEC, inoperable because as noted above, the AEC requires an accurate representation of the microphone and loudspeaker signals.

In a full duplex audio system, an AEC is a necessity. As discussed above, the active AEC can subtract room echoes due to the loudspeakers in the conference room from the microphone signals. This requires an accurate representation of microphone signals which is often not available in a remote link.

It is desirable to overcome the constraints discussed above.

BRIEF SUMMARY OF THE INVENTION

The present invention discovers and resolves the problems associated with lossy data compression and audio echo cancellers (AECs). The lossy audio codec (audio data compressor and decompressor) is installed farther away from the microphone signal and the signal to the loudspeaker than the AEC, such that within a signal path between the AEC and the microphones, there is no signal distortion. While the signal to the AEC representing the loudspeaker is distorted due to having traveled through a codec, this invention compensates for that by passing the signal through an identical codec prior to sending it to the loudspeaker. In consequence, the signal seen by the loudspeaker is identical to the signal seen by the AEC, and echo cancellation can be performed with high quality. Thus, matched distortions occur in the signal path from the signal to the loudspeaker and from the signal to the AEC). There is no distortion in the paths of sound waves from the loudspeaker to the microphone, the audio signal generated from the microphone, and consequently the microphone signal to the AEC. Other parts of the signal processing path in an audio conferencing system may contain signal distortions due to lossy signal processing, but they do not affect the operation of the AEC because they lie outside the echo canceller path. For example, the echo free audio signal output from the AEC may be distorted when it is processed by further signal processing for transmission to a far end in a teleconferencing application. The loudspeaker signals from the far end may also be distorted during the signal processing before being fed into the final loudspeaker amplification.

This lossy audio system with AEC may be used in teleconference system as the audio system for one site. It may also be used as an audio system in a theater, a lecture hall, where vocal sound or music sound needs to be amplified and reproduced at the same location. The AEC and the full-duplex audio system make it possible for the lecturer or music player to co-mingle with the audience so that the lecturer or the musician can have a more interactive relationship with the students or audience, and allow the audience to more actively participate in the experience.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 3:
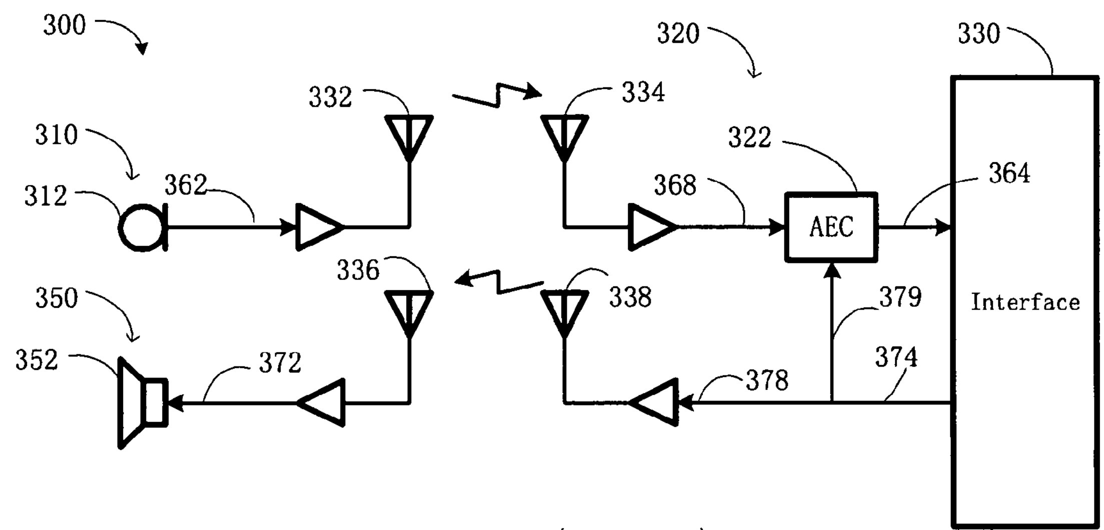
FIG. 3 shows a prior art similar system as in FIG. 1 except that the microphone and the loudspeaker are connected to a base station wirelessly.
Figure 4A:
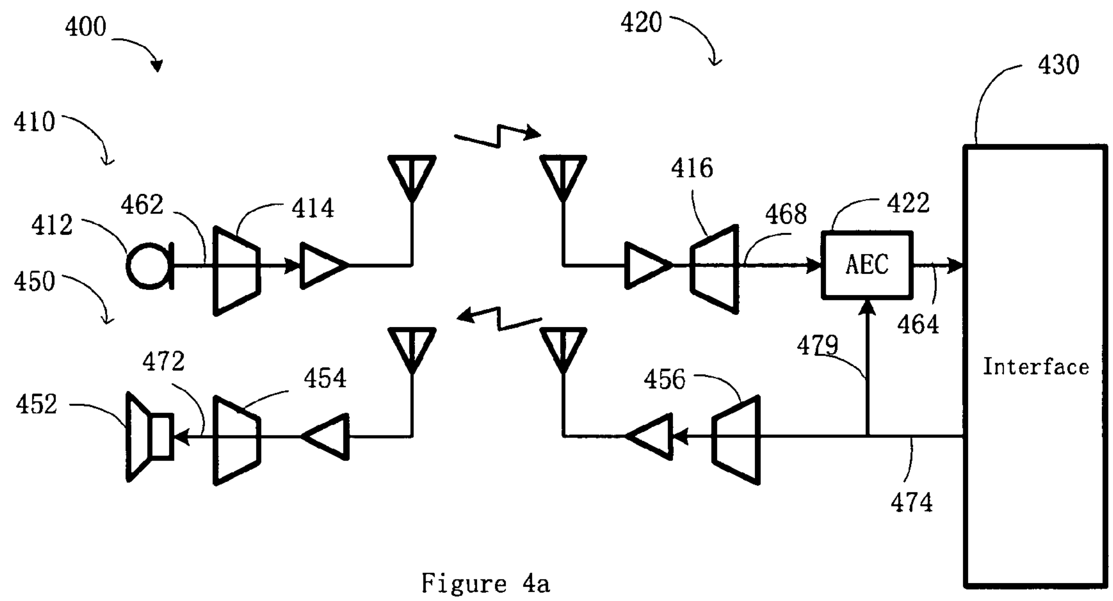
FIGS. 4*a* and 4*b* show two systems similar to FIG. 3 in an attempt to compress the microphone signal and loudspeaker signal in order to reduce bandwidth requirement. These two figures illustrate configurations that will work poorly, a problem that is solved by the present invention.

FIG. 4*a* shows a system which compresses the microphone signal and the loudspeaker signal in order to reduce the bandwidth requirement. An audio system 400 is shown, which is similar to the system 300 shown in FIG. 3, except that the signals have been compressed to fit more easily in a standard wireless link such as Bluetooth, 802.11, WDCT or DECT. Compressors to perform this function are commonly known in the art and can be any common or proprietary style, such as G.711, G.722, G.722.1, G.722.2, G.723, G.729, MPEG, ADPCM, etc. The system 400 also has a microphone module 410, a speaker module 450, a base station 420 and an interface 430. In this system 400, the AEC 422 is placed within the base station 420 which is coupled to the interface 430. A microphone signal input 468 to AEC 422 has gone through compression at compressor 414 and decompression at decompressor 416, whereas the loudspeaker reference signal 479 to the AEC 422 is provided without any process of compression and decompression. The loudspeaker signal 472 that is fed into the loudspeaker 452 is the loudspeaker signal 474 after it goes through the compressor 456, and decompressor 454. In most processes of compression and decompression, signals are distorted. Therefore the microphone signal 468 that is fed into AEC 422 is slightly different from the microphone signal 462 generated by the microphone 412. Similarly loudspeaker signal 479 fed into AEC 422 is slightly different from the loudspeaker signal 472 that is reproduced by the loudspeaker 452. Therefore, the part of signal contained in the microphone signal 468 due to the loudspeaker echo has been distorted twice. The first distortion takes place in the loudspeaker signal path from signal 474 to 472. The second distortion takes place in the microphone signal path from signal 462 to 468. This part of the signal in microphone signal 468 due to loudspeaker echo is different from the loudspeaker input signal 479. In most AEC algorithms, the AEC assumes that if the microphone signal is different in anyway from the loudspeaker or reference signal, that difference is due to echoes and reverberation. If there are any differences that are not due to the echoes, such as distortion, the AEC 422 will not work properly. The distorted loudspeaker signals, which are the echoes that need to be eliminated, may be treated as actual speech and fed back to the system. As for the system 400 shown in FIG. 4*a*, it is found that such distortion prevents the AEC 422 from working properly.

Figure 4B:
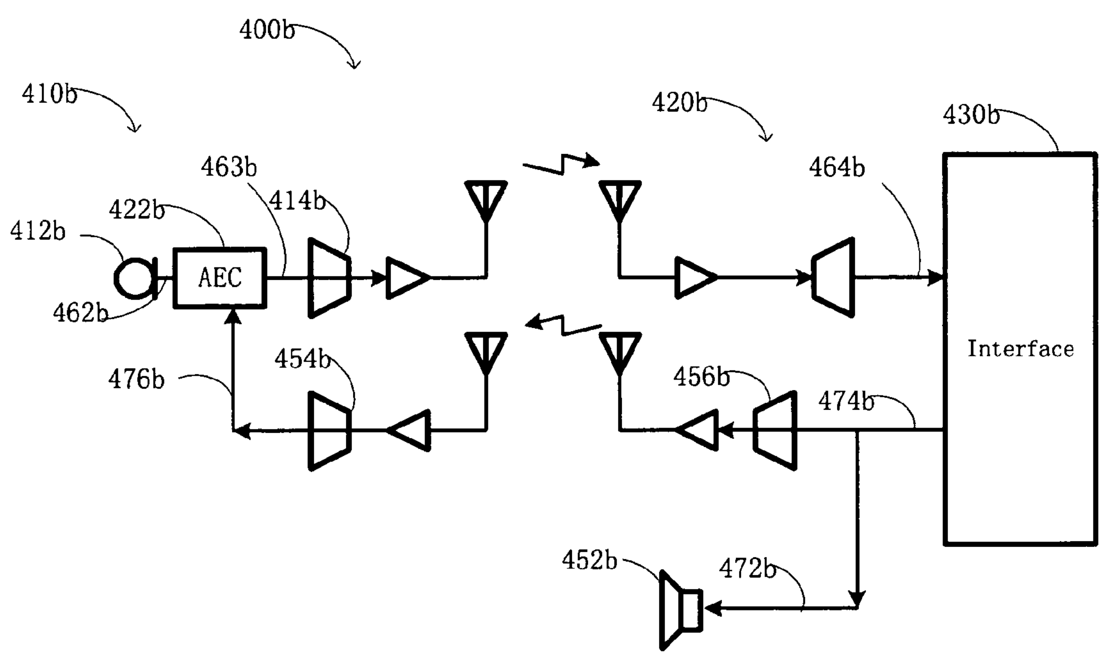

FIG. 4*b* illustrates another similar installation using a lossy codec to reduce the bandwidth requirement. One major difference from the installation of FIG. 4*a* is that AEC 422*b* is installed in the microphone module 410*b*, rather than the base station 420*b*. The loudspeaker 452*b* is connected directly to the base station 420*b* and is fed by the loudspeaker signal 472*b*, which is identical to loudspeaker signal 474*b* from the interface 430*b*. The loudspeaker reference signal 476*b* still has to go through the wireless transmission, compression/decompression process, because it needs to be fed into the AEC module 422*b* that is in the wireless microphone module 410*b*. The loudspeaker reference signal 476*b* is the loudspeaker signal 474*b* after going through encoder 456*b*, wireless transmitter and receiver, and decoder 454*b*. Microphone 412*b* generates microphone signal 462*b*, which is fed into the AEC module 422*b* directly. A supposedly substantially echoless output signal 463*b* from the AEC module 422*b* then goes through the compression/decompression and wireless transmission process and becomes signal 464*b*, which is fed into the interface 430*b*. The AEC now gets the microphone signal 462*b* without distortion, but its reference signal 476*b* (distorted via the codec) still does not match the signal 472*b* that actually went to the loudspeaker 452*b* (non-distorted). In other words, difference between the signal 472*b* and 476*b* cannot be canceled by the AEC, even though that is part of the loudspeaker echo rather than the speech from a targeted source.

In the installation as shown in either FIG. 4*a* or 4*b*, the AEC does not work very well. It is also found that AEC generally does not work well with audio systems with many popular lossy codecs. But in many digital audio/video protocols, such as MP3, MPEG, lossy codecs are used. According to the current invention, AECs can work properly with any lossy codecs if they are combined and implemented in a proper way.

Figure 5A:
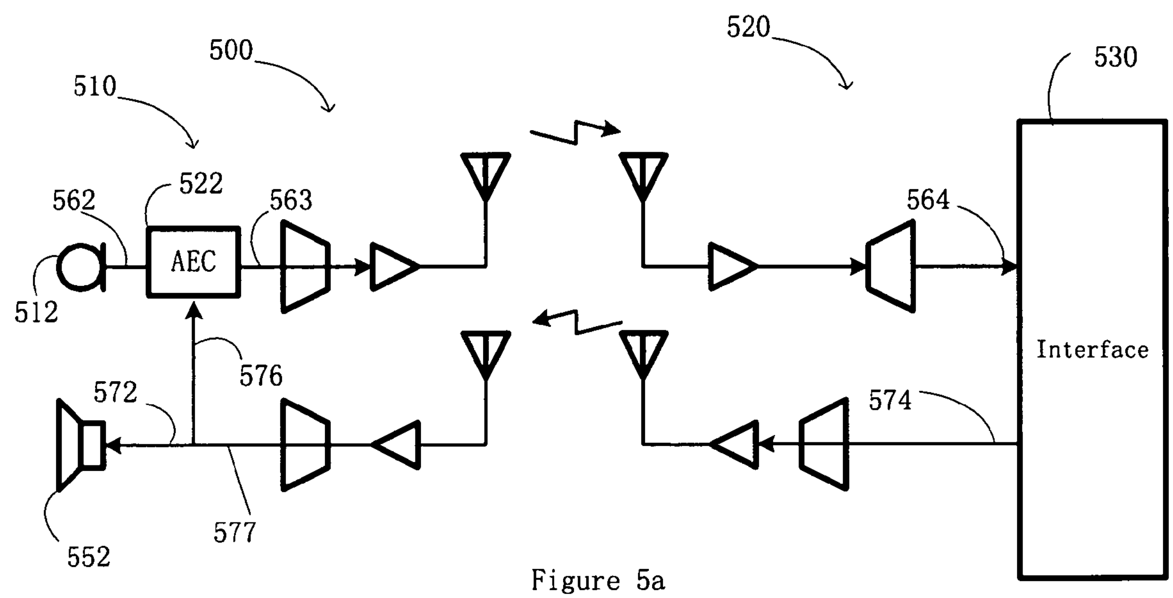
FIG. 5*a* shows a single channel system with a wireless microphone, a wireless loudspeaker, lossy codec and an incorporated AEC. In this system the microphone and the loudspeaker are wired together in a same module.

FIG. 5*a* shows a system 500 that has a lossy codec used in a wireless microphone and loudspeaker system where the AEC can function properly. The system 500 contains a microphone module 510, a base station 520 and an interface 530. One difference between FIG. 5*a* and FIG. 4*a* is that the AEC 522 in system 500 is moved from the base station 520 towards the microphone 512 and the loudspeaker 552. In this system the microphone input signal 562 to AEC 522 is directly coming from the microphone 512. The loudspeaker signal input 576 is the same as the audio signal 572 going to the loudspeaker 552. Therefore, the feedback picked up by microphone 512 is the same as what is reproduced by the loudspeaker 552. Since the two input signals 562 and 576 from the microphone 512 and the loudspeaker 552 are the exact signals generated by the microphone and reproduced by the loudspeaker, the AEC 522 can properly cancel the feedback due to the loudspeaker 552 to generate a substantially echo free audio signal 563. It is noted though that the audio signal 563 is slightly different from the audio signal 564 which is the signal 563 going through compression (encoding), wireless transmission and decompression (decoding). This audio signal 564, even though slightly different than the signal 563, has no effect on the AEC 522. Similarly, the loudspeaker signal 574 coming from the interface component 530 is slightly different than the audio signal 577 which is fed to the loudspeaker 552 and reproduced. It, too, has no effect on the AEC 522. In this system, the microphone 512 and the loudspeaker 552 are located in the same microphone module 510 such that the distorted audio signal to the loudspeaker (compared to the original feed signal 574) is transmitted to the AEC 522. This way the distorted signal picked up by the microphone 512 matches the distorted signal 576. The decoded loudspeaker signal 577, which is sent to the loudspeaker 552 as signal 572, is connected to the loudspeaker input of AEC 522 directly as signal 576. The substantially echoless microphone signal 563 does not have any such requirement. The signal 563 is coupled to the interface 530 through several intermediate components, including the base station 520. In the system 500, the base station 520 is closely connected to the interface 530 by audio output (microphone signal) 564 and audio input (loudspeaker signal) 574.

Figure 5B:
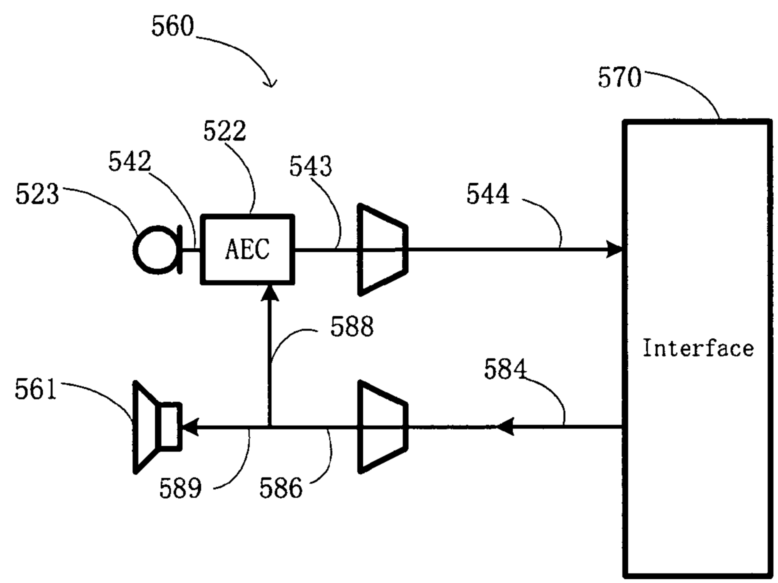
FIG. 5*b* shows a similar system without wireless communication. This illustrates the application of the present invention to the problems shown in FIGS. 4*a* and 4*b*.

FIG. 5*b* shows a similar system 560 as in FIG. 5*a*, except the signals are wired. Also the signals 584 and 544 coming from and going to the interface 570 are encoded (compressed) signals, rather than decoded signals, such as 574 and 564 in FIG. 5*a*. The encoded signals require much less bandwidth to transmit to other locations, such in a teleconferencing application. With the same amount of bandwidth, many more sites or participants may join a teleconference. In this embodiment, microphone 523 generates audio signal 542 and feeds audio signal 542 to the AEC 522. The audio signal 542 contains feedback signals due to the reproduced sound from loudspeaker 561. The sound reproduced by the loudspeaker 561 is the same as signal 589, which is identical to signals 588 and 586. The signal 588 is the loudspeaker input signal to the AEC 522. The loudspeaker signal 586 is a loudspeaker signal decoded from the loudspeaker signal 584 which is from the interface component 570. The same decoded loudspeaker signal 586 is connected to the AEC as signal 588 and the loudspeaker 561 as signal 589. The substantially echoless microphone signal 543 from the AEC 522 is coupled to the interface 570 through an encoder. The coded audio signals 544 and 584 may be coded by any lossy codec. These signals or their codecs are not in the signal path that may affect the function of the AEC 522. System 560 is one of the embodiments of the current invention that makes AECs and lossy codecs work together.

In FIG. 5*a* (similarly in 5*b*), the loudspeaker signal 577 (586) is split into two signals 576 and 572 (588 and 589). These two signals 576 and 572 (588 and 589) may be split equally, i.e. they have the same profiles, same amplitudes, same phases etc. They are may also be split unequally. For example, the loudspeaker reference signal 576 only needs a very small amplitude to drive the AEC, while the loudspeaker signal 572 may want a larger amplitude to lessen the amplification requirement. The loudspeaker signals shown in FIGS. 5*a* and 5*b* are typically analog signals, but they can also be digital signals or in other formats.

Figure 6A:
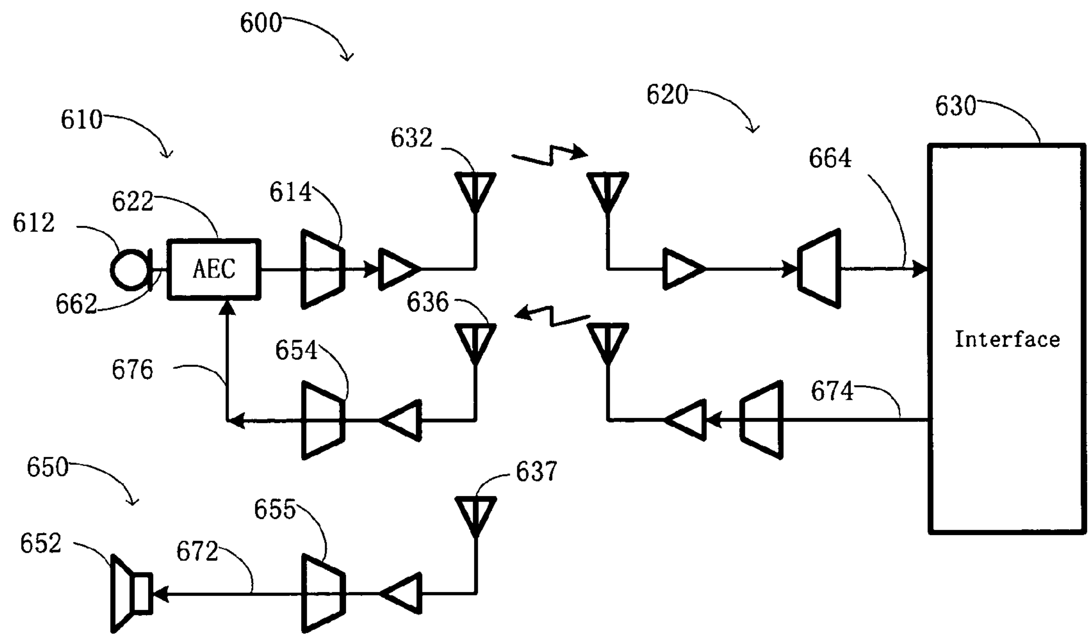
FIGS. 6*a* and 6*b* are similar to FIG. 5 except the microphone and the loudspeaker are not wired together. The microphone module and the loudspeaker module may be placed independently.

FIG. 6*a* shows another system 600 which is slightly different from the system 500 as shown in FIG. 5*a*. System 600 contains a microphone module 610, a loudspeaker module 650, a base station 620 and an interface 630. The microphone module 610 is the same as microphone module 510 shown in FIG. 5*a* except that microphone module 610 does not have a loudspeaker. Except for the loudspeaker, the combination of microphone module 610, the base station 620 and the interface 630 works exactly the same as the corresponding modules in system 500 shown in FIG. 5*a*. In the microphone module 610, the microphone signal and the loudspeaker signal are routed and processed exactly the same way as in the microphone module 510 shown in FIG. 5*a*. In system 600, the loudspeaker signal 674 from the interface goes through the encoding (compression), wireless transmission, decoding (decompression) process and becomes a loudspeaker signal 676 which is an input signal to AEC 622. Unlike the system 500 as shown in FIG. 5*a*, the loudspeaker is not in the same module 610 as the microphone 612. Therefore, the loudspeaker signal 676 is only fed into the AEC 622.

In this system 600, the loudspeaker 652 is in a loudspeaker module 650, separated from the microphone module 610. The loudspeaker module 650 has a separate receiver 637 and decoder (decompressor) 655, both of which are identical to the receiver 636 and decoder (decompressor) 654 in the microphone module 610. Therefore, the decoded loudspeaker signal 672 is identical to loudspeaker signal 676. So the sound reproduced by loudspeaker 652 from loudspeaker signal 672 is the same as if it were from loudspeaker signal 676. As far as the AEC 622 is concerned, the echo signal from the loudspeaker goes through the same path, i.e. loudspeaker signal 676 (identical to 672) to the loudspeaker 652, is picked up by microphone 612, becomes a part of microphone signal 662 and is fed into AEC 622. This path is the same as shown in FIG. 5*a*. In the view of the interface 630, the rest of system 600 works the same way as the rest of system 500 shown in FIG. 5*a*.

In system 600 the microphone module 610 and the loudspeaker module 650 are separated. These two modules can be placed in the conference room independently and in a more convenient location as determined by a particular conference or lecture. Although the microphone signal transmitter 632 and loudspeaker signal receiver 636 in the microphone module 610 are separately shown in FIG. 6, those transmitters and receivers may very well be a single transmitter and receiver physically. Logically, the microphone signals and loudspeaker signals are segregated and independent.

In FIG. 6*a*, the AEC 622, compressor (encoder) 614 for the microphone signals and decompressor (decoder) 654 for the loudspeaker signals may be embedded in a single DSP (digital signal processor). The additional power consumption due to the processing of loudspeaker signals compared to the system in FIG. 5*a* can be negligible. The microphone, the DSP and transmitter/receiver are all low power consumption components, therefore, the microphone module 610, including all these components, can be powered by batteries and can operate for a reasonable period of time without recharging or changing batteries. The same DSP used within the microphone module 610 may also perform other signal processing or conditioning, such as noise reduction, noise compensation, automatic gain control etc. The noise reduction is to reduce the background noise in the microphone signals. The noise compensation is to add artificial noise when the sound level becomes too low, which can be uncomfortable for audience. The loudspeaker module 650 that includes the loudspeaker 652, receiver 637 and decompressor 655 can also be powered by battery in some applications. An identical DSP can be used in the loudspeaker module 650.

Due to the combination of the use of lossy codecs and AECs, each microphone module 610, as shown in FIG. 6*a*, requires a very narrow bandwidth to transmit its signal to the base station 620. Therefore, many wireless microphone modules may be installed and used with the same base station simultaneously. Multiple microphone modules can provide better audio pickup coverage over a larger area, such as in a large conference room or a lecture hall. The capacity of such audio system may be increased easily and incrementally, by adding microphone modules.

Figure 6B:
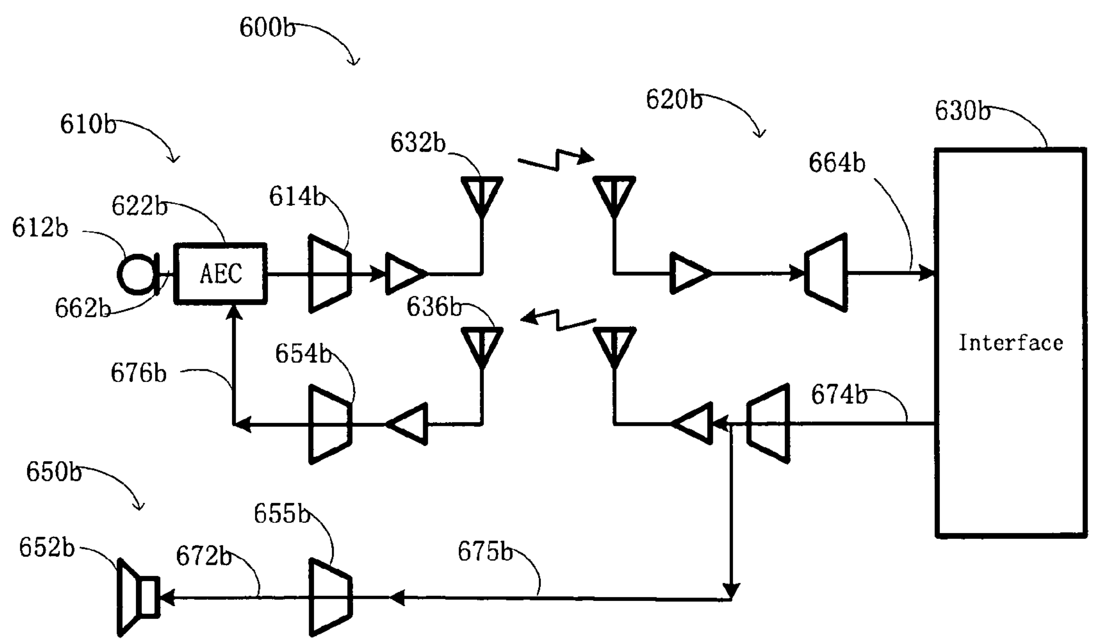

FIG. 6*b* shows an almost identical system as the one shown in FIG. 6*a* with a slight simplification. In many applications, the loudspeaker module does not need to be mobile. Rather than having a separate wireless loudspeaker module 650 as shown in FIG. 6*a*, the audio system 600*b* has a wired loudspeaker unit 650*b*, which can be integrated into the base station 620*b* or closely tied to it. The loudspeaker signal 675*b* is an encoded loudspeaker signal. The encoded loudspeaker signal 675*b* goes into a decoder 655*b* to be regenerated as a decoded loudspeaker signal 672*b*, and is the fed into the loudspeaker 652*b*. The decoder 655*b* is the same as 654*b* to ensure consistency between signals 672*b* and 676*b* to ensure proper functioning of AEC 622*b*. The decoded loudspeaker signal 672*b* is reproduced by the loudspeaker 652*b*. Except the difference between whether the loudspeaker signal goes through a wireless connection (as in system 600*b*) or a wired connection (as in system 600), the signal paths in both systems are identical. Therefore, these two systems operate almost in the same way.

Figure 7:
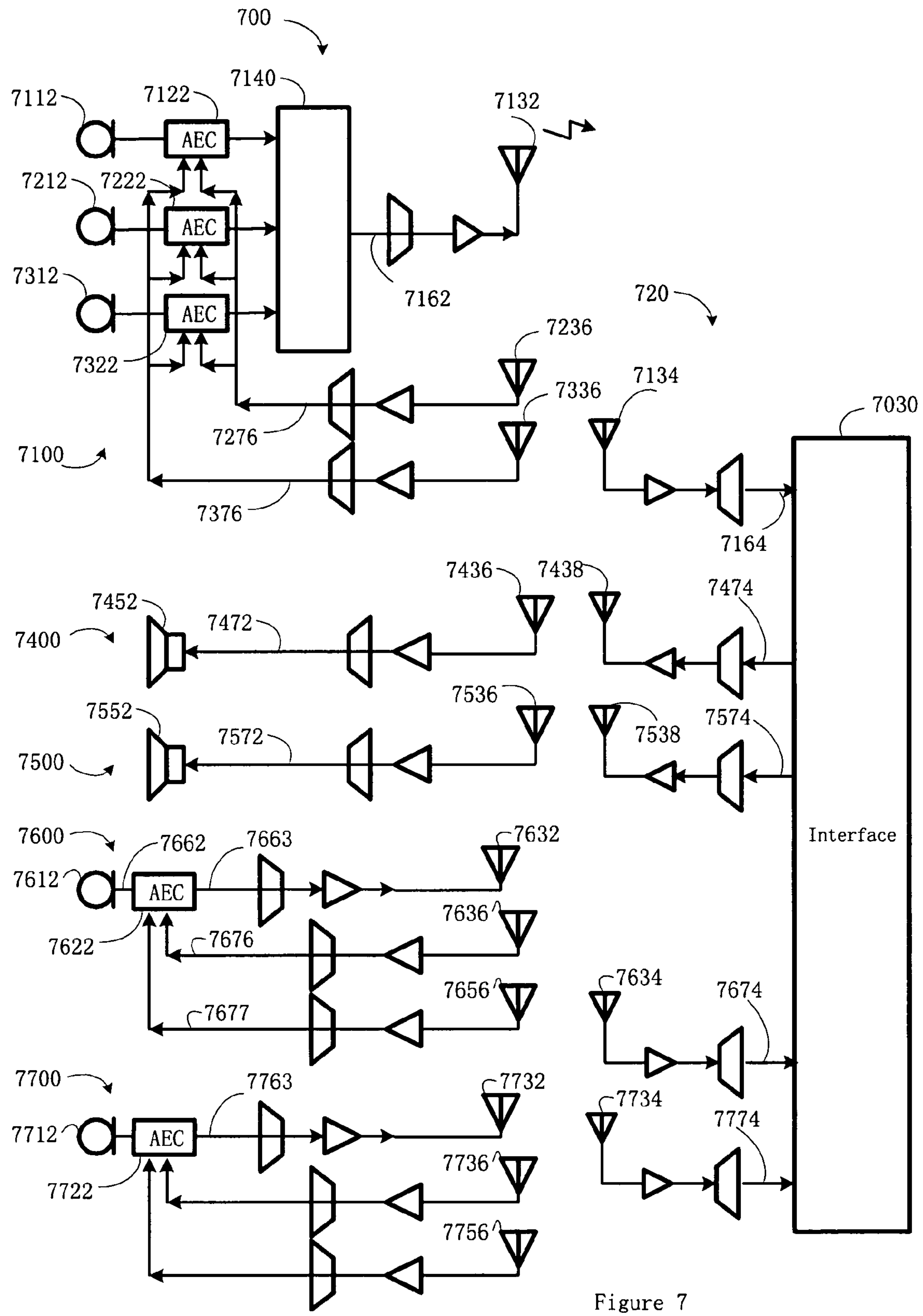
FIG. 7 shows a system with two audio channels, such as stereo speakers. Each audio channel has multiple wireless microphones implementing lossy codecs and AECs.

FIG. 7 shows a more complicated audio system 700 where multiple audio channels are implemented and where each audio channel may have multiple microphone modules. Each microphone module may have multiple microphone elements. There are many variations or mutations of the configurations of an audio system. System 700 shown in FIG. 7 is for illustration purposes only. System 700 has microphone modules 7100, 7600 and 7700, loudspeaker modules 7400 and 7500, a base station 720 and an interface 7030. There are two audio channels, one left channel which contains microphone module 7100 and a loudspeaker module 7400; and one right channel which contains microphone modules 7600 and 7700 and a loudspeaker 7500. The two audio channels share a base station 720 and an interface 7030. In another configuration, each audio channel may have its own base station and interface.

Figure 1:
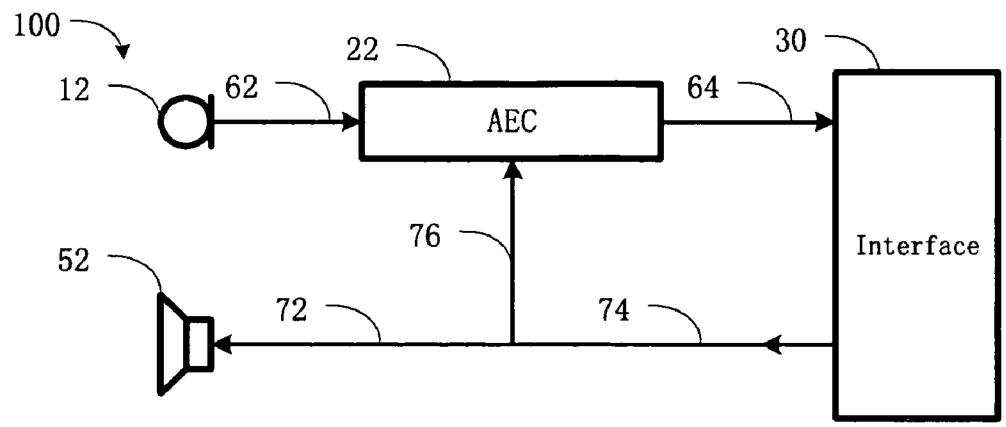
FIG. 1 shows a prior art single echo canceller with its two inputs and one output in a single channel audio system.
Figure 2:
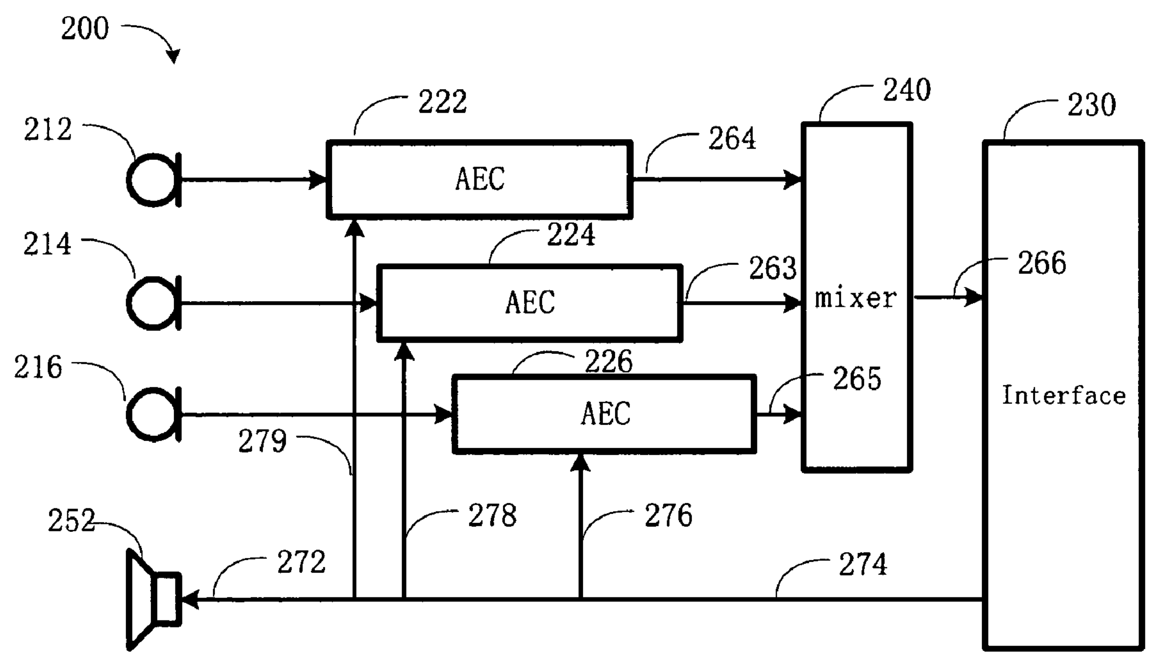
FIG. 2 shows a prior art multi-microphone system in which each microphone has its independent AEC.

In the left channel, the microphone module 7100 contains three microphone elements 7112, 7212 and 7312, similar to the system 200 shown in FIG. 2. Each microphone element has its own AECs 7122, 7222 and 7322. In system 700, there are two audio channels, so there are two independent loudspeakers producing these two different sounds. To remove the echoes due to these two different sounds, the AECs have two loudspeaker input signals, or reference signals, one for each audio channel. As shown in FIG. 7, the decoded loudspeaker signal 7276 for left channel and decoded loudspeaker signal 7376 for the right channel are fed to each of the three AECs 7122, 7222 and 7322. The substantially echo free output signals from the AECs 7122, 7222 and 7322 are then fed into a mixer 7140 to form a single microphone signal for the left channel. The mixer 7140 may perform signal gating, signal gain control and other functions. The resulting left channel microphone signal 7162 is substantially echo free. The microphone signal 1762 is encoded, transmitted and decoded to become a microphone signal 7164. The left channel microphone signal 7164 is fed to the interface 7030.

The microphone module 7100 has receiver/transmitter 7132, 7236, 7336 for the left channel microphone signal, the left channel loudspeaker signal and the right channel loudspeaker signal. The received and decoded loudspeaker signals 7276 and 7376 are used as loudspeaker input signals for the AECs in the microphone module 7100. The loudspeaker signal 7276 is the left loudspeaker signal 7474 from the interface 7030 after it goes through the encoding, transmission and decoding process. Similarly, the loudspeaker signal 7376 is the loudspeaker signal 7574 after it goes through the same process.

The two loudspeaker modules 7400 and 7500 may have the same configuration. In the left channel loudspeaker module 7400, the loudspeaker signal for the left channel is received by the receiver 7436, decoded and fed to the loudspeaker 7452 as loudspeaker signal 7472. Similar to the system in FIG. 6, the decoder and the receiver in loudspeaker module 7400 is the same as the decoder and the receiver for the left channel in the microphone module 7100. Therefore, the loudspeaker signal 7472, which goes to the loudspeaker 7452, is identical to the loudspeaker signal 7276 which is the loudspeaker input signal to the AECs. The AECs 7122, 7222 and 7322 work in a similar way as the AEC 622 works shown in FIG. 6. The loudspeaker module 7500 for the right channel works the same as the loudspeaker module 7400. The loudspeaker signal 7572 which goes to the loudspeaker 7552 is identical to the loudspeaker signal 7376 in microphone module 7100.

For illustration purposes the microphone modules for the right channel are implemented differently. Two independent microphone modules 7600 and 7700 are implemented for the right channel. Each microphone module 7600 or 7700 may be identical. For example, in microphone module 7600, there are receivers 7636 and 7656 for both the left loudspeaker signal and the right loudspeaker signal, and a transmitter 7632 for the microphone signal. The microphone module 7600 also includes an AEC 7622 to generate the substantially echoless microphone signal 7663, which is the microphone signal 7662 minus the contributions from the loudspeaker signals 7676 and 7677. The substantially echoless microphone signal 7663 from the microphone module 7600 may be encoded and transmitted, and then received by a receiver 7634 at the base station 720. In the example of FIG. 7, two independent microphone modules 7600 and 7700 are shown. The two substantially echoless microphone signals are decoded as signals 7674 and 7774 then combined by a mixer (not shown) at the base station 720 or interface 7030. At the base station 720, the microphone signals and the loudspeaker signals for each channel may be further processed.

The various signals transmitted or received between various modules are independently transmitted or received logically. Logically, the transmitter/receiver pairs are: for the left channel microphone signal, transmitter 7132 and receiver 7134; for the left channel loudspeaker signal, transmitter 7438, and receivers 7436, 7236, 7636, 7736; for the right channel loudspeaker, transmitter 7538 and receivers 7536, 7336, 7656 and 7756; for the first microphone signal for the right channel, transmitter 7732 and receiver 7634; for the second microphone signal, transmitter 7732 and receiver 7734. The transmitters and receivers 7134, 7438, 7538, 7634 and 7734 may be implemented in the same base station 720 as shown in FIG. 7. They are also be implemented any where within the base station 720 and the interface 730.

As shown in the above figures, wireless microphone modules and wireless loudspeaker modules can be mixed and matched. This way, when an additional microphone in a full duplex system is desired, a wireless microphone can be added in the system without modification of other parts of the system. By transmitting the compressed (encoded) loudspeaker signal to this microphone module and embedding an AEC inside the microphone module, one can allow the microphone module to reproduce exactly the same distorted loudspeaker signal that is going to a loudspeaker module elsewhere in the system. This way, the microphone signal coming from the additional microphone module is always substantially echo free microphone signal. The full-duplex operation of the system can be maintained.

Although the AECs, codecs or transmitter/receivers are shown and assigned to each individual microphone element or individual loudspeaker signal, they do not have to be separate physical components. As discussed in reference to the embodiment shown in FIG. 6*a*, a single DSP may perform many of the functions. A single transceiver may also transmit and receive multiple channels of audio signals, as long as each signal can be segregated when necessary. Similarly, multiple codecs may reside in a single device. Or a more sophisticated codec may be able to encode or decode multiple signals independently.

In the audio system 700, more audio channels may be built into the system and each audio channel may be capable of having multiple microphone modules. This ability to expand the system's capacity as demand grows makes the system very flexible.

Figure 8:
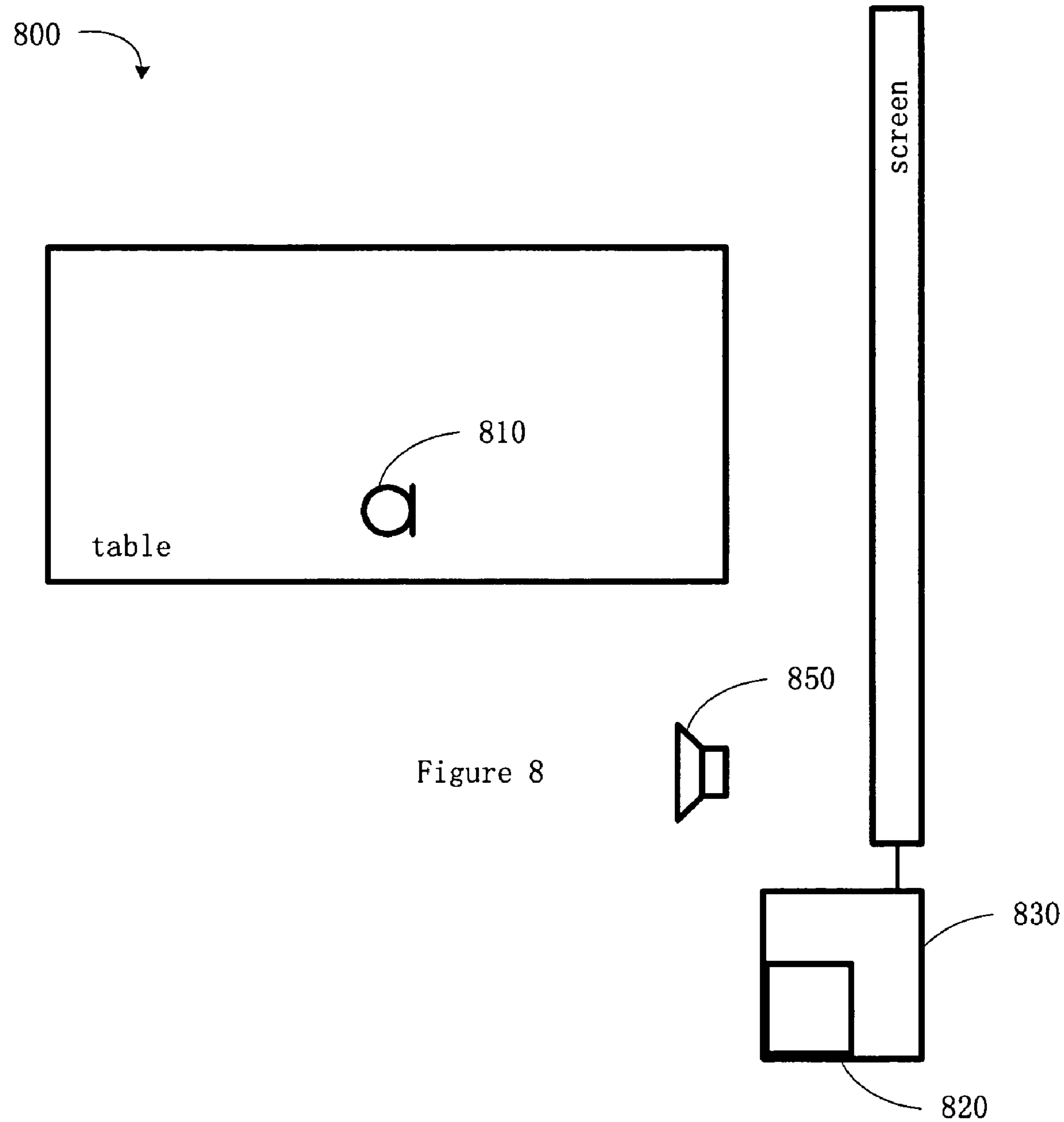
FIG. 8 shows a setup for single audio channel audio system.

FIG. 8 illustrates an arrangement of a single audio channel audio system 800 using the system as illustrated in FIG. 6. The wireless microphone module 810 is placed in a conference room independent of the loudspeaker module 850 and the base station 820 which is integrated to the interface 830. The base station 820 is connected to the power source and the interface component 830. The base station 820 and the interface component 830 are powered by regular AC power from a wall socket. On the other hand, the wireless microphone module 810 and the wireless loudspeaker module 850 are powered by batteries. The microphones may be held by talkers in a conference. The talker having the wireless microphone modules 810 are able to walk around the conference room while talking.

Figure 9:
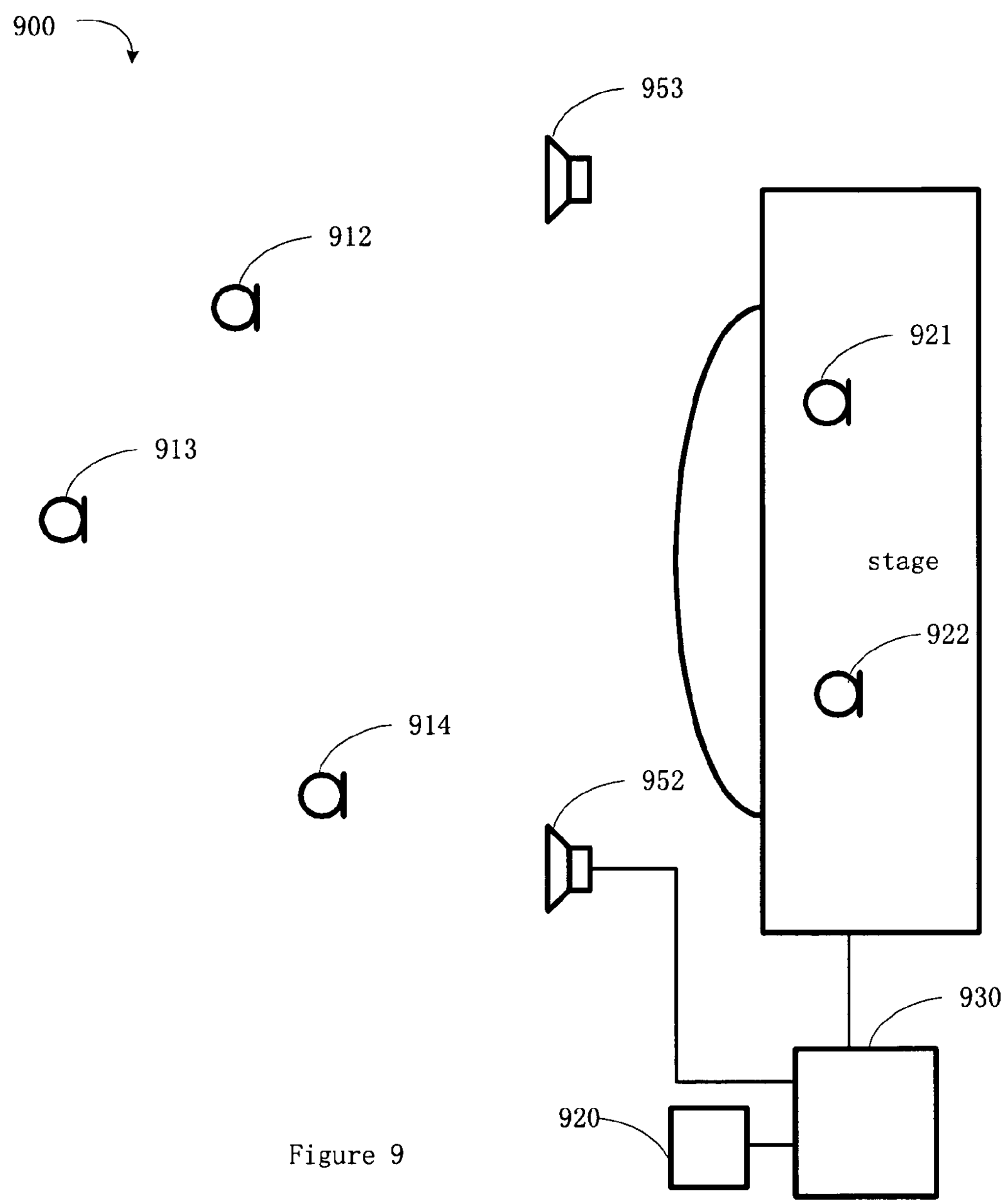
FIG. 9 shows an audio system set up with multiple audio channels having multiple wireless speakers and wireless microphones.
Figure 10A:
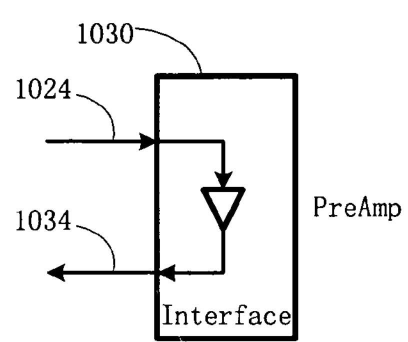
FIGS. 10*a* and 10*b* show more details inside interface components for different applications.
Figure 10B:
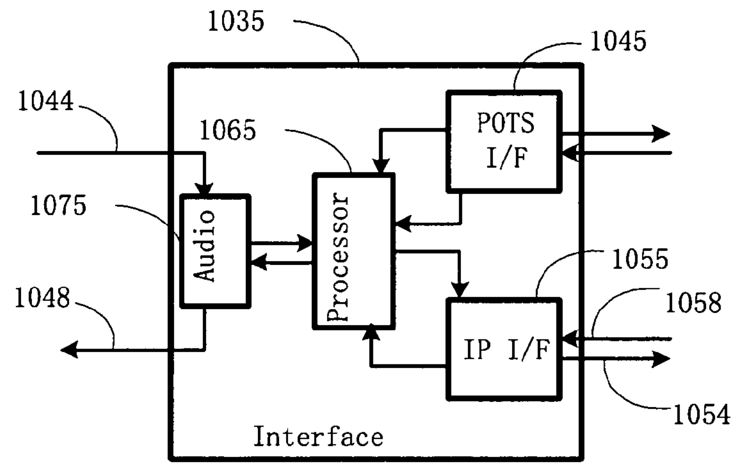

FIG. 9 illustrates a multichannel audio system arrangement 900 in a lecture hall/auditorium arrangement. Here the microphones for different channels are independently arranged in the conference room in desired locations. Those locations for the microphone modules 912, 913 and 914 are not dictated by any availability of power from wall sockets. Similarly, the loudspeaker module 953 may also be placed independently around the conference room. The loudspeaker 953 may be powered by battery, while the loudspeaker module 952 may be powered from regular wall socket through the base station 920 as shown. The base station 920 for the audio system 900 may be placed close to a wall socket which can provide maximum power supply. In this arrangement, multiple audio channels may be established. For example, two microphone modules 921 and 922 are used to establish two audio channels for on-stage performance or lecturing, so that the audience in the auditorium can hear stereo sound of the performance. At least one additional audio channel is established for audience participation using multiple microphone modules 912, 913 and 914. The signals from the audience channel may be gated and mixed, and then panned into the audio system for amplification and sent back to the audience.

As discussed above, the audio system may be used in many different applications. Due to the use of lossy codecs (compressor/decompressor) and their high compression capabilities, the bandwidth requirement for signal transmission, either between the microphone module and the base stations, or between a near end conference site and a far end conference site is greatly reduced. As such, many more audio channels may be established within the same available bandwidth. The greater number of audio channels improves the sound reproduction qualities. More wireless microphone modules make it possible for more conference participants to actively engage in live discussion in a much larger conference hall.

As discussed above, the interfaces (30, 230, 330 etc.) may be very different for different applications. The details of the interfaces are not of concern of the current invention. An appropriate interface is used for the intended application.

In the description above and the claims below, the term "loudspeaker" may also refer to a combination of a loudspeaker including a power amplifier which is essentially free of codec related artificial distortions. The term "loudspeaker signal" may refer to a pre-amplified loudspeaker signal or an after-amplified signal that can drive a loudspeaker directly. The term "encoder" and "decoder" may refer to any pair of devices that can process a signal, where the first device (the encoder) converts the signal to a new format for one purpose or another, and the second device (the decoder) converts the signal from the new format to its original format. The conversion may be done in an analog domain, or in a digital domain. Although the "encoder" and "decoder" are mostly used in and referred to the digital compression/expansion situations, they may be used in and referred to other signal processes. For example, an analog encoder and an analog decoder are used in an analog radio transmission with dynamic range manipulation, where the process often accompanies with some losses of the signal fidelity. Another example of analog encoding/decoding is Dolby nonlinear processing, which is aimed to reduce audible noises, where an inaudible signal distortion is introduced into the signal during encoding/decoding.

While illustrative embodiments of the invention have been illustrated and described, it will be appreciated that various changes can be made therein without departing from the spirit and scope of the invention.

I claim:

1. A method for implementing an audio signal lossy codec and an audio echo canceller (AEC), the method comprising:

feeding a microphone signal generated by a microphone to the AEC as the microphone input;

encoding and decoding a loudspeaker signal at the near end using the lossy codec to generate an encoded and decoded loudspeaker signal;

feeding the encoded and decoded loudspeaker signal into the AEC as the loudspeaker signal input; and feeding the encoded and decoded loudspeaker signal into a loudspeaker.

2. The method of claim 1, further comprising:

the AEC generating a substantially echoless microphone signal; and encoding, at the near end, the substantially echoless microphone signal using the lossy codec.

3. The method of claim 2, further comprising:

decoding, at the near end, the encoded substantially echoless microphone signal using the lossy codec to generate the decoded loudspeaker signal.

4. The method of claim 1, further comprising:

the AEC generating substantially echoless output signal;

encoding the substantially echoless microphone signal using the lossy codec;

transmitting the encoded substantially echoless microphone signal for further processing; and receiving an encoded loudspeaker signal.

5. The method of claim 4, further comprising performing any one or more of noise reduction, noise compensation, and automatic gain control.

6. The method of claim 4, wherein the further processing includes:

transmitting the encoded substantially echoless microphone signal to a base station through a wireless connection; and receiving the encoded loudspeaker signal from the base station through a wireless connection.

7. The method of claim 6, wherein the further processing includes:

the base station sending the encoded substantially echoless microphone signal to be the encoded loudspeaker signal.

8. The method of claim 4, wherein the further processing includes:

reformatting and transmitting the encoded substantially echoless microphone signal to a far end conference site through a network; and receiving the encoded loudspeaker signal from the far end conference site through the network.

9. The method of claim 1, wherein the AEC includes a plurality of loudspeaker inputs, the method further comprising:

feeding a plurality of decoded loudspeaker signals into the AEC as the loudspeaker signal inputs, wherein the AEC is operable to generate the substantially echoless output signal, which is substantially the microphone signal minus the plurality of decoded loudspeaker signals; and feeding the plurality of decoded loudspeaker signals into a plurality of loudspeakers, each of which amplifies the decoded loudspeaker signal and reproduces the sound.

10. The method of claim 2, wherein the lossy codec is an analog lossy codec.

11. The method of claim 2, wherein the lossy codec is a digital lossy codec.

12. A microphone module in a near end audio system with a loudspeaker, wherein the loudspeaker reproduces sound from a loudspeaker signal, the microphone module comprising:

a microphone element;

an audio echo canceller (AEC) coupled to the microphone element; and a decoder which receives an encoded loudspeaker signal and provides the loudspeaker signal to the AEC, wherein the loudspeaker signal is encoded by an encoder at the near end.

13. The microphone module of claim 12, wherein the loudspeaker signal received at the AEC is an analog signal and has the same profile as the loudspeaker signal reproduced by the loudspeaker.

14. The microphone module of claim 13, wherein the loudspeaker signal received at the AEC further has the same amplitude as the loudspeaker signal reproduced by the loudspeaker.

15. The microphone module of claim 12, wherein the encoder is a digital encoder and the decoder is a digital decoder.

16. The microphone module of claim 12, wherein the encoder is an analog encoder and the decoder is an analog decoder.

17. The microphone module of claim 12, further comprising:

an encoder, wherein the encoder is operable to encode the AEC output signal.

18. The microphone module of claim 12:

wherein the AEC comprises a microphone signal input, a loudspeaker reference signal input and an AEC output;

wherein the microphone signal input is coupled to the microphone element; and wherein the loudspeaker reference signal input is coupled to the loudspeaker signal.

19. The microphone module of claim 18, wherein the loudspeaker is connected to the AEC loudspeaker reference signal and produces sound from the loudspeaker signal.

20. The microphone module of claim 18, wherein the audio system has a base station, the microphone module further comprising:

a wireless transceiver coupled to the encoder output and the decoder input, wherein the wireless transceiver is in wireless communication with the base station.

21. The microphone module of claim 20, wherein the wireless transceiver is capable using one of the wireless methods of Bluetooth, 802.11, WDCT, and DECT.

22. The microphone module of claim 12, further comprising:

a second audio input; and a second decoder, having a second decoder input and a second decoder output;

wherein the second decoder input is coupled to the second audio input, and the second decoder is operable to decode the second audio input signal, and wherein the AEC further includes a second loudspeaker input which is connected to the second decoder output, the AEC further operable to generate the output signal from the microphone input, the loudspeaker input and the second loudspeaker input, wherein the output signal is essentially the microphone input signal minus a substantial portion of the loudspeaker input signal and the second loudspeaker input signal.

23. The microphone module of claim 22, further comprising:

a wireless transceiver coupled to the encoder output and the decoder input and the second decoder input;

wherein the encoder output is coupled to the audio output through the transceiver and the decoder inputs are coupled to the audio input and the second audio input through the transceiver.

24. The microphone module of claim 12, further comprising:

a second AEC, each including a second microphone input, a second loudspeaker input and a second AEC output, wherein the second AEC is operable to generate the second AEC output signal from the second microphone input and the second loudspeaker input, wherein the second AEC output signal is essentially the second microphone input signal minus a substantial portion of the second loudspeaker input signal;

a second microphone elements, operable to generate a second microphone signal, wherein the second microphone signal is connected to a second microphone input of a second AEC;

an audio mixer having a plurality of audio mixer inputs and an audio mixer output, operable to generate an audio mixer output from the plurality of audio mixer inputs;

wherein the second AEC loudspeaker input is connected to the decoder output;

wherein the AEC output is connected to an audio mixer input;

wherein the second AEC output is connected to an audio mixer input; and wherein the mixer output is connected to the encoder input.

25. The microphone module of claim 24 wherein the mixer is further operable to perform signal gating or signal gain control.

26. An audio system at a near end comprising:

a microphone module wherein the microphone module includes:

a microphone element;

a decoder which receives an encoded loudspeaker signal and provides the loudspeaker signal; and an audio echo canceller (AEC) coupled to the microphone element and the decoder, wherein the AEC receives the loudspeaker signal from the decoder; and an interface module having an interface audio input, an interface audio output and an encoder to produce an encoded loudspeaker signal.

27. The audio system of claim 26, wherein loudspeaker signal received at the AEC is an analog signal and has the same profile as the loudspeaker signal reproduced by the loudspeaker.

28. The audio system of claim 27, wherein the loudspeaker signal received at the AEC further has the same amplitude as the loudspeaker signal reproduced by the loudspeaker.

29. The audio system of claim 26, wherein the encoder is a digital encoder and the decoder is a digital decoder.

30. The audio system of claim 26, wherein the encoder is an analog encoder and the decoder is an analog decoder.

31. The audio system of claim 26, wherein:

the decoder is operable to decode the encoded loudspeaker signal to generate the decoded loudspeaker signal; and the encoder is operable to encode the AEC output signal.

32. The audio system of claim 31:

wherein the AEC comprises a microphone signal input, a loudspeaker reference signal input and an AEC output;

wherein the microphone signal input is coupled to the microphone element;

wherein the loudspeaker reference signal input is coupled to the loudspeaker signal.

33. The audio system of claim 26, wherein the microphone module further includes a loudspeaker for producing sound, wherein the loudspeaker is connected to the AEC loudspeaker reference input.

34. The audio system of claim 33, further comprising:

a base station coupled to the interface module, where in the base station includes:

a base station wireless transceiver having input and output connections;

a base station input coupled to the interface audio output and the wireless transceiver input; and a base station output coupled to the interface audio input and the wireless transceiver output, wherein the microphone module further includes a microphone wireless transceiver coupled to the decoder input;

wherein the microphone wireless transceiver is in radio communication with the base station transceiver, and wherein the decoder input is coupled to the interface audio input through the microphone module wireless transceiver and the base station wireless transceiver.

35. The audio system of claim 34, wherein the base station wireless transceiver and the microphone module wireless transceiver are capable using one of the wireless methods of Bluetooth, 802.11, WDCT and DECT.

36. The audio system of claim 33:

wherein the interface further includes a plurality of interface audio outputs;

wherein the microphone module further includes a plurality of decoders, each having a decoder input and a decoder output;

wherein each decoder input is coupled to one of the plurality of interface audio outputs, and each decoder is operable to decode one of the plurality of interface audio output signals, and wherein the AEC further includes a plurality of loudspeaker inputs which are connected to the decoder outputs of the plurality decoders, the AEC further operable to generate the output signal from the microphone input and the plurality of loudspeaker inputs, wherein the output signal is essentially the microphone input signal minus a substantial portion of the plurality of loudspeaker input signals.

37. The audio system of claim 36, wherein the plurality of decoders are in a single device.

38. The audio system of claim 33, wherein the microphone module further includes:

a second AEC including at least a second microphone input, a second loudspeaker input and a second AEC output, wherein the second AEC is operable to generate the second AEC output signal from the second microphone input and the second loudspeaker input, wherein the second AEC output signal is essentially the second microphone input signal minus a substantial portion of the second loudspeaker input signal;

a second microphone element operable to generate a second microphone signal, wherein the second microphone signal is connected to a second microphone input of a second AEC; and an audio mixer having a plurality of audio mixer inputs and an audio mixer output, operable to generate an audio mixer output from the plurality of audio mixer inputs;

wherein the second AEC loudspeaker input is connected to the decoder output;

wherein the AEC output is connected to an audio mixer input;

wherein the second AEC output is connected to an audio mixer input; and wherein the mixer output is connected to the encoder input.

39. The audio system of claim 36, wherein the mixer is further operable to perform signal gating or signal gain control.

40. The audio system of claim 33, further comprising:

a loudspeaker module, wherein the loudspeaker module includes:

a loudspeaker; and a loudspeaker lossy decoder including a loudspeaker decoder input and a loudspeaker decoder output;

wherein the loudspeaker decoder input is coupled to the interface audio output, wherein the loudspeaker decoder output is connected to loudspeaker, wherein the loudspeaker decoder is operable to generate the speaker decoder output signal that is identical to the AEC loudspeaker input signal.

41. The audio system of claim 40, further comprising:

a base station coupled to the interface module, wherein the base station includes:

a base station wireless transceiver having input and output connections;

a base station input coupled to the interface audio output and the wireless transceiver input; and a base station output coupled to the interface audio input and the wireless transceiver output, wherein the loudspeaker module further includes a loudspeaker wireless receiver having an output connection, the wireless receiver output connection coupled to the loudspeaker decoder input;

wherein the loudspeaker wireless receiver is in radio communication with the base station transceiver;

wherein the loudspeaker decoder input is coupled to the interface audio output through the loudspeaker wireless receiver and the base station wireless transceiver;

wherein the microphone module further includes a microphone wireless transceiver coupled to the decoder output and encoder input;

wherein the microphone wireless transceiver is in radio communication with the base station transceiver;

wherein the decoder input is coupled to the interface audio output through the microphone module wireless transceiver and the base station wireless transceiver; and wherein the encoder output is coupled to the interface audio input through the microphone module wireless transceiver and the base station wireless transceiver.

42. The audio system of claim 41, wherein the wireless transceiver is capable using one of the wireless methods of Bluetooth, 802.11, WDCT and DECT.

43. The audio system of claim 41, wherein the loudspeaker module is battery powered.

44. The audio system of claim 40, further comprising:

a second loudspeaker module, wherein the second loudspeaker module includes:

a second loudspeaker; and a second loudspeaker lossy decoder including a second speaker decoder input and a second speaker decoder output;

wherein the second speaker decoder output is coupled to loudspeaker, wherein the second speaker decoder is operable to generate the speaker decoder output signal that is identical to the AEC loudspeaker input signal; and a second microphone module wherein the second microphone module includes:

a second AEC having at least a second microphone input, a loudspeaker input and a second loudspeaker input and a second AEC output, wherein the second AEC is operable to generate the second AEC output signal from the second microphone input, the loudspeaker input and the second loudspeaker input, wherein the second AEC output signal is essentially the microphone input signal minus a substantial portion of the two loudspeaker input signals, the loudspeaker input being connected to the decoder output;

a microphone element operable to generate a second microphone signal, wherein the second microphone signal is connected to the second microphone input of the second AEC;

a second encoder operable to encode signals; and a second decoder operable to decode encoded signals;

wherein the second encoder includes a second encoder input and a second encoder output, wherein the second encoder input is coupled to the second AEC output;

wherein the second decoder includes a second decoder input and a second decoder output, and wherein the second decoder output is connected to the second AEC loudspeaker input;

wherein the interface module further includes a second interface audio input and second interface audio output independent from the interface audio input and interface audio output;

wherein the second interface audio output is coupled to the second decoder input and the second interface audio input is coupled to the second decoder output; and wherein the AEC in the microphone module further includes an additional loudspeaker input, wherein the additional loudspeaker input is coupled to the second decoder output, and wherein the AEC is further operable to generate the AEC output signal from the microphone input, the loudspeaker input and the additional loudspeaker input, wherein the AEC output signal is essentially the microphone input signal minus a substantial portion of the loudspeaker input signal and the additional loudspeaker input.

45. The audio system of claim 33, wherein the loudspeaker decoder input is coupled to the interface audio output through a wired connection.

46. The audio system of claim 33, wherein the microphone module is battery powered.

47. The audio system of claim 33, wherein the microphone module is coupled to the interface module through a wired connection.

48. The audio system of claim 33, wherein the microphone module is coupled to the interface module through a wireless connection.

49. The audio system of claim 48, wherein the wireless connection is a Bluetooth connection.

50. The audio system of claim 48, wherein the wireless connection is an 802.11 connection.

51. The audio system of claim 48, wherein the wireless connection is a DECT connection.

52. The audio system of claim 33, wherein the interface module processes the interface audio input signal to generate the interface audio output signal.

53. The audio system of claim 33:

wherein the interface module includes a network interface which is operable to couple to a far end conferencing system;

wherein the network interface is operable to send the interface audio input signal to the far end conference system; and wherein the network interface module is operable to receive a signal from a far end conference system to generate the interface audio output signal.

54. The audio system of claim 53, wherein the network interface is a POTS network interface.

55. The audio system of claim 53, wherein the network interface is an IP network interface.

56. A loudspeaker module for a near end audio system, the loudspeaker module comprising:

a loudspeaker module input;

a loudspeaker for producing sound;

a lossy decoder including a decoder input and a decoder output, operable to decode the decoder input and generate the decoder output;

wherein the decoder input is coupled to loudspeaker module input;

wherein the decoder output is connected to loudspeaker, and wherein the loudspeaker module input receives an encoded loudspeaker signal that is encoded with a lossy encoder at the near end.

57. The loudspeaker module of claim 56, further comprising:

a wireless receiver having an output connection, the wireless receiver output connection coupled to the decoder input;

wherein the decoder input is coupled to loudspeaker module input from the audio system through the wireless receiver.

58. A near end audio system comprising:

one or more microphone modules wherein each microphone module includes:

one or more audio echo cancellers (AEC) having a microphone input, one or more loudspeaker inputs and an AEC output, wherein the AEC is operable to generate the AEC output signal from the microphone input and the loudspeaker inputs, wherein the AEC output signal is essentially the microphone input signal minus a substantial portion of the loudspeaker input signals;

one or more microphone elements, each operable to generate a microphone signal, wherein each microphone signal is connected to a microphone input of a respective AEC;

one or more lossy encoders, each having an encoder input and an encoder output, each encoder input coupled to a respective AEC output; and one or more lossy decoders, each having a decoder input and a decoder output, each decoder output coupled to a loudspeaker input of each AEC in the microphone module;

one or more loudspeaker modules, wherein each loudspeaker module includes:

a loudspeaker; and a loudspeaker lossy decoder including a loudspeaker decoder input and a loudspeaker decoder output, the loudspeaker decoder output coupled to the loudspeaker; and an interface module having one or more interface audio inputs and one or more interface audio outputs;

wherein each interface audio input is coupled to an encoder output of a respective microphone module;

wherein each interface audio output is coupled to a decoder input in each microphone module and a decoder input of a respective loudspeaker module; and wherein loudspeaker input signals of one or more AECs is encoded and decoded by the one or more lossy encoder and the one or more lossy decoders at the near end.

59. The audio system of claim 58 further comprising:

one or more base stations, each having one or more wireless receivers and one or more wireless transmitters;

wherein each base station wireless receiver has a receiver output coupled to a respective interface audio input;

wherein each base station wireless transmitter has a transmitter input coupled to a respective interface audio output;

wherein at least one microphone module has a microphone wireless receiver coupled to the lossy decoder input and a microphone wireless transmitter coupled to lossy encoder output;

wherein the microphone wireless receiver is in radio communication with the base station wireless transmitter; and wherein the microphone wireless transmitter is in radio communication with the base station wireless receiver.

60. The audio system of claim 58 further comprising:

wherein at least one loudspeaker module has a loudspeaker wireless receiver coupled to the loudspeaker lossy decoder input;

wherein each loudspeaker wireless receiver is in radio communication with a base station wireless transmitter.

* * * * *